Figure 1:
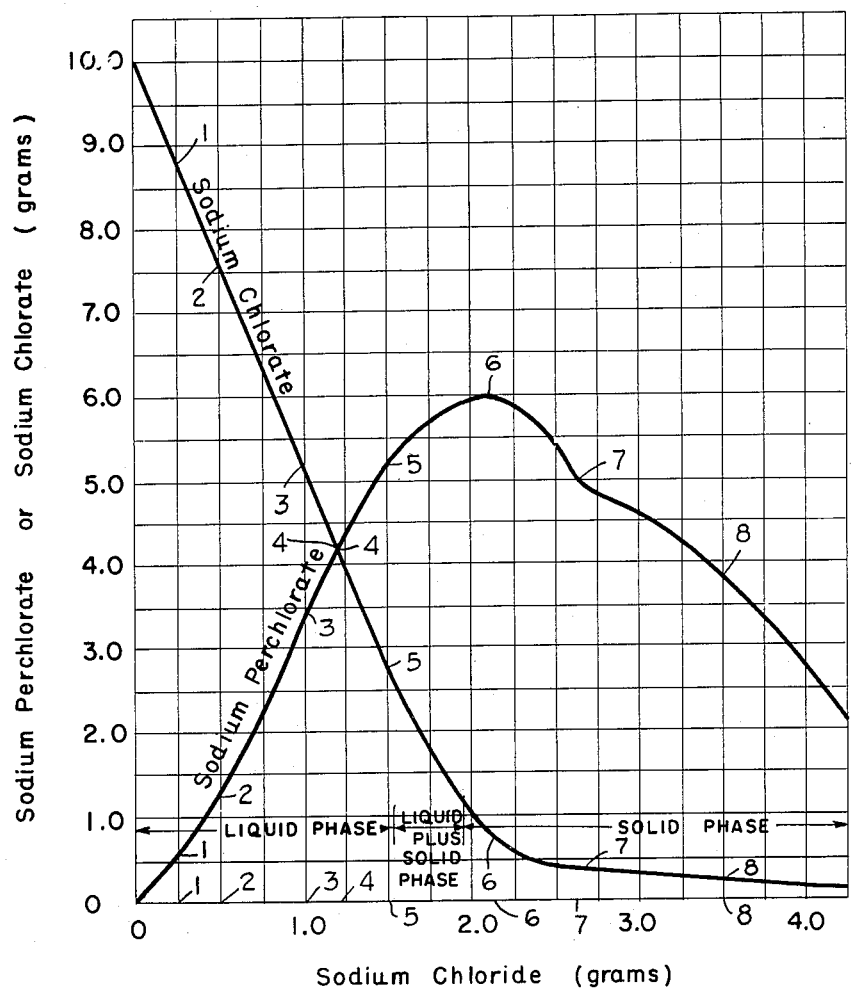

Product Composition for the Thermal Decomposition of Sodium Chlorate
( 400 - 600° C : 0.167 to 8.0 Hours )

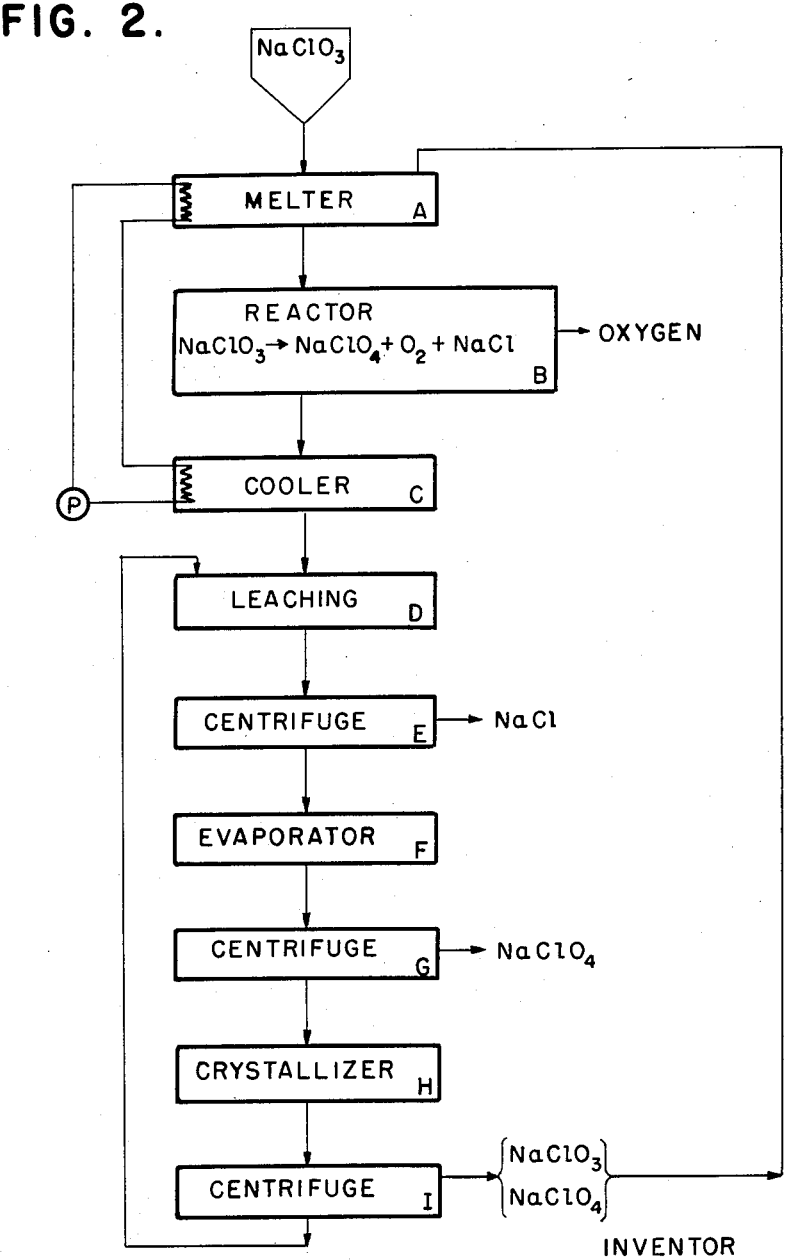

United States Patent Office 2,733,982
Patented Feb. 7, 1956

2,733,982

PROCESS FOR MAKING SODIUM PERCHLORATE FROM MOLTEN SODIUM CHLORATE

Joseph C. Schumacher, Los Angeles, Calif., assignor to Western Electrochemical Company, Culver City, Calif., a corporation of California Application September 29, 1952, Serial No. 312,137

7 Claims. (Cl. 23—85)

This invention relates to a process for making sodium perchlorate from sodium chlorate.

The principal object of the invention is to provide a thermal method for converting sodium chlorate to sodium perchlorate.

There is a growing demand for sodium perchlorate as an ingredient of rocket propellants and other pyrotechnic compositions. Heretofore sodium perchlorate and other perchlorates have been made entirely by electrochemical methods involving the use of platinum for the electrodes. The investment in the platinum electrodes and the irrecoverable loss of the platinum in their continued use in the electrolytic cells consitutes a large item of cost in the manufacture of perchlorates. Platinum is scarce; the limited available national supply would not approach being large enough to meet requirements for contemplated large scale production of sodium perchlorate for use in rocket fuels, propellants and explosives. While chlorates are generally formed by electrochemical reactions using electrodes, it is possible to carry out this electrochemical reaction with electrodes other than platinum, as for example, in the electrolytic cell disclosed in my Patent No. 2,515,614 in which iron and carbon electrodes are used.

I have discovered that sodium perchlorate may be made economically by the thermal decomposition of sodium chlorate in a continuous process in which the unreacted sodium chlorate is returned for recycling through the decomposition process. In my process I control the time and temperature to which the melted sodium chlorate is subjected and thereafter extract the sodium perchlorate by a water crystallization process which avoids any possibility of uncontrolled explosive reactions.

In the thermal decomposition of sodium chlorate, sodium chlorate melted at temperatures between 400° and 600° gradually thickens because of the formation of sodium chloride and sodium perchlorate, both of which have higher temperatures than does the chlorate. The reactions are believed to be as follows:

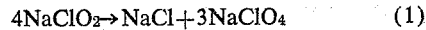
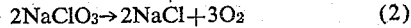
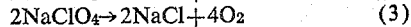

$$4NaClO_3 \rightarrow NaCl + 3NaClO_4 \quad (1)$$
$$2NaClO_3 \rightarrow 2NaCl + 3O_2 \quad (2)$$
$$2NaClO_4 \rightarrow 2NaCl + 4O_2 \quad (3)$$

The rate of decomposition of the sodium perchlorate within this range of temperatures of 400° to 600° is less rapid than is the rate of formation of the perchlorate from the chlorate, and therefore depending upon the time and the temperature, mixtures of sodium chlorate, sodium chloride and sodium perchlorate are obtained. When the amounts of chloride and perchlorate reach the point that the material is thickened and behaves as a solid, the batch is difficult to handle and the decomposition of the perchlorate content becomes appreciably fast, as shown in the diagram, Fig. 1. Many batches of pure sodium chlorate were heated for various lengths of time from 0.167 to 8 hours, and at temperatures in the range from 400 to 600° C. and the proportions of sodium chlorate, sodium perchlorate and sodium chloride in the reacted batches were determined. These proportions were plotted with the parts by weight for perchlorate or chlorate shown on the vertical scale, and the parts by weight for sodium chloride being shown on the horizontal scale. For example, a batch after heating which contained 1 part by weight (from 10 original parts by weight of sodium chlorate) contained 3.5 parts by weight of sodium perchlorate and 5.25 parts by weight of sodium chlorate. It will be observed that the decomposition of the sodium perchlorate becomes rapid after the composition is reached which contains 2.25 parts by weight of sodium chloride; and obviously, eventually all sodium perchlorate and sodium chlorate become decomposed and only sodium chloride remains. Examination of the batches containing (after the heat treatment) .25, .50, 1.0, 1.2, 1.5, 2.2, 2.6 and 3.5 parts by weight of sodium chloride (in 10 parts of original sodium chlorate) give proportions of sodium perchlorate, and sodium chlorate as shown in the table below, with derived percentages of yield and conversion efficiency.

TABLE

*Thermal decomposition of sodium chlorate*

| | NaClO₃ Orig. (g) | NaCl Remaining (g) | NaClO₃ Remaining (g) | NaClO₃ Reacted (g) | NaClO₄ª (Theoretical (g) | NaClO₄ Yield (g) | NaClO₄ᵇ Yield (percent) | Conversionᶜ Efficiency (percent) |
|---|---|---|---|---|---|---|---|---|
| 1 | 10.00 | .25 | 8.75 | 1.25 | 1.08 | 0.50 | 4.32 | 46.3 |
| 2 | 10.00 | .50 | 7.60 | 2.40 | 2.07 | 1.40 | 12.10 | 67.7 |
| 3 | 10.00 | 1.00 | 5.20 | 4.80 | 4.14 | 3.25 | 28.00 | 78.7 |
| 4 | 10.00 | 1.2 | 4.20 | 5.80 | 5.00 | 4.20 | 36.20 | 84.1 |
| 5 | 10.00 | 1.5 | 2.75 | 7.25 | 6.25 | 5.00 | 43.20 | 80.0 |
| 6 | 10.00 | 2.2 | 0.75 | 9.25 | 7.98 | 6.00 | 51.70 | 75.2 |
| 7 | 10.00 | 2.6 | 0.40 | 9.60 | 8.27 | 5.00 | 36.2 | 60.4 |
| 8 | 10.00 | 3.5 | 0.25 | 9.75 | 8.40 | 4.00 | 33.5 | 47.6 |

ª Calculated from the following equation:

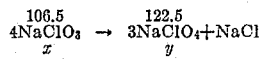

$$4NaClO_3 \rightarrow 3NaClO_4 + NaCl$$
$$\quad x \qquad\qquad y$$

$$y = .75 \,(122.5/106.51)\; x = 0.862x$$

ᵇ Yield divided by amount theoretically possible if 10 grams reacted (8.62 g.).
ᶜ Actual quantity formed divided by theoretical equivalent of NaClO₃ reacted.

In the diagram Fig. 2 there is shown schematically the several steps of the thermal process of making sodium perchlorate from sodium chlorate. Sodium chlorate crystals obtained from any suitable source are introduced into a continuous melter and the liquid transferred to a reactor chamber in which the melted material is held at a selected temperature in the range from 400° to 600° C. until the melted mixtures begin to thicken due to the production of sodium perchlorate and sodium chloride. Oxygen gas is given off in the reactor and is collected.

The liquid melt, after retarded passage through the reactor, is transferred to a cooler, and then passed through a cooler in solid form, whereby the temperature is reduced to approximately 100° to 150° C. From this cooler the solidified liquid in suitable form for leaching is transferred to a leaching vessel where the most soluble portion is extracted by an aqueous solution, which is then recycled after the sodium chlorate has been crystallized out and removed, this aqueous liquid containing dissolved sodium chlorate, sodium perchlorate and sodium chloride. The amount of recirculated aqueous solution is used which will dissolve out substantially all of the sodium chlorate and sodium perchlorate from the cooled melt. The mixture of liquid and undissolved sodium chloride crystals is then separated by passage through a continuous centrifuge in which sodium chloride is removed as crystals and the liquid is passed to an evaporator in which the liquid is concentrated until sodium perchlorate crystallizes out. The liquid is separated from the crystals of sodium perchlorate in a continuous centrifuge which receives the concentrated liquor from the evaporator. The liquid is then passed into a crystallizer where it is cooled and crystals of sodium chlorate are formed and are removed from the liquid by means of a centrifuge. The aqueous liquid from this centrifuge is then recycled as the leaching liquor, being pumped to the leaching vessel. The sodium chlorate crystals containing some sodium perchlorate crystals are recycled to the melter to supplement the make-up sodium chlorate introduced into the process.

The advantages of my process will be apparent. Sodium perchlorate is produced without the employment of platinum for electrodes, as required in the electrochemical process. A continuous thermal method of making sodium perchlorate is provided which is economical, and capable of expansion to many units without limitation as may be required for military or civilian propulsion purposes.

I claim:

1. In the thermal process for making sodium perchlorate the steps comprising melting sodium chlorate; maintaining the melted sodium chlorate at a temperature in the range from 400 to 600° C. until a mixture containing unreacted sodium chlorate, a minor amount of sodium chloride, and a predominant amount of sodium perchlorate is formed during said heating, and the mixture is in a flowable state; cooling the mixture to a solidified mixed salt containing predominantly sodium perchlorate and minor proportions of sodium chloride and undecomposed sodium chlorate; leaching said cooled mixture with an aqueous liquid; and fractionally crystallizing out said sodium perchlorate.

2. In the thermal process for making sodium perchlorate the steps comprising melting sodium chlorate; maintaining the melted sodium chlorate at a temperature in the range from 400 to 600° C. until a mixture containing unreacted sodium chlorate, a minor amount of sodium chloride, and a predominant amount of sodium perchlorate is formed during said heating, and the mixture is in a flowable state; cooling the mixture to a solidified mixed salt containing predominantly sodium perchlorate and minor proportions of sodium chloride and undecomposed sodium chlorate; leaching said cooled mixture with an aqueous liquid; and fractionally crystallizing out said sodium perchlorate.

3. In the thermal process for making sodium perchlorate the steps comprising melting sodium chlorate; maintaining the melted sodium chlorate at a temperature in the range from 400 to 600° C. until a mixture containing unreacted sodium chlorate, a minor amount of sodium chloride, and a predominant amount of sodium perchlorate is formed during said heating, cooling the mixture to a solidified mixed salt containing predominantly sodium perchlorate and minor proportions of sodium chloride and undecomposed sodium chlorate; leaching out sodium chlorate and sodium perchlorate from said mixed salt; and fractionally crystallizing out said sodium perchlorate.

4. In the thermal process for making sodium perchlorate the steps comprising melting sodium chlorate; maintaining the melted sodium chlorate at a temperature in the range from 400 to 600° C. until a mixture containing unreacted sodium chlorate, a minor amount of sodium chloride, and a predominant amount of sodium perchlorate is formed during said heating, cooling the mixture to a solidified mixed salt containing predominantly sodium percholate and minor proportions of sodium chloride and undecomposed sodium chlorate; leaching out the sodium chlorate and sodium perchlorate from said mixed salt with an aqueous leaching solvent substantially saturated with sodium chloride and fractionally crystallizing out said sodium perchlorate.

5. In the thermal process for making sodium perchlorate the steps comprising melting sodium chlorate; maintaining the melted sodium chlorate at a temperature in the range from 400 to 600° C. until a mixture containing unreacted sodium chlorate, a minor amount of sodium chloride, and a predominant amount of sodium perchlorate is formed during said heating, cooling the mixture to a solidified mixed salt containing predominantly sodium perchlorate and minor proportions of sodium chloride and undecomposed sodium chlorate; leaching out the sodium chlorate and sodium perchlorate with an aqueous leaching solution substantially saturated with sodium chloride; and fractionally crystallizing out crystalline sodium perchlorate from said leaching solution.

6. In the thermal process for making sodium perchlorate the steps comprising melting sodium chlorate; maintaining the melted sodium chlorate at a temperature in the range from 400 to 600° C. until a mixture containing unreacted sodium chlorate, a minor amount of sodium chloride, and a predominant amount of sodium perchlorate is formed during said heating, and the mixture is in a fluid state; cooling the mixture to a solidified mixed salt containing predominantly sodium perchlorate and minor proportions of sodium chloride and undecomposed sodium chlorate; leaching out the sodium chlorate and sodium perchlorate with an aqueous leaching solution substantially saturated with sodium chloride; separating out crystalline sodium perchlorate and crystalline sodium chlorate by fractional crystallization; and recirculating the mother liquor from said fractional crystallization of sodium perchlorate and sodium chlorate to said leaching out step.

7. The process defined in claim 1 in which the reacted mixture is cooled rapidly to a temperature in the range of 100° C. to 150° C.

References Cited in the file of this patent

J. W. Mellor's "A Comprehensive Treatise on Inorganic and Theoretical Chemistry," vol. 2, 1922 ed., pages 326–327, Longmans, Green and Co., N. Y.

Hackh's "Chem. Dictionary," third ed., revised, page 780, The Blakiston Co., Philadelphia, Pa.